Figure 1:
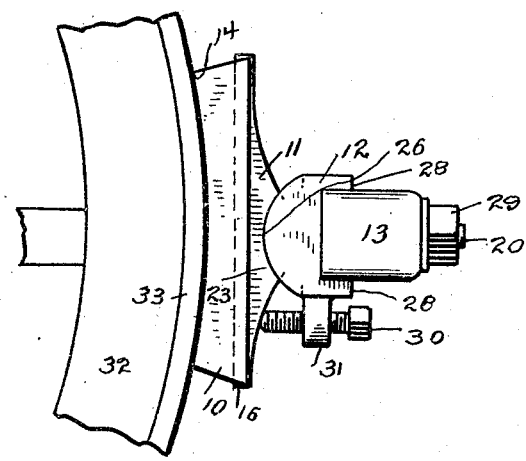

No. 788,192. PATENTED APR. 25, 1905.
J. DEMPSEY.
TIRE BRAKE.
APPLICATION FILED NOV. 28, 1904.

WITNESSES:
H. A. Lamb
S. W. Atherton

INVENTOR
John Dempsey
BY
A. M. Wooster
ATTORNEY

No. 788,192. Patented April 25, 1905.

UNITED STATES PATENT OFFICE.

JOHN DEMPSEY, OF MILLERTON, NEW YORK.

TIRE-BRAKE.

SPECIFICATION forming part of Letters Patent No. 788,192, dated April 25, 1905.

Application filed November 28, 1904. Serial No. 234,500.

*To all whom it may concern:*

Be it known that I, JOHN DEMPSEY, a citizen of the United States, residing at Millerton, county of Dutchess, State of New York, have invented a new and useful Tire-Brake, of which the following is a specification.

My invention relates to tire-brakes for either light or heavy vehicles, and has for its object to provide a brake adapted for general use and especially adapted for use upon stages, trucks, and other heavy vehicles where a tire-brake of great durability and holding power is required.

With these ends in view I have devised a simple and inexpensive brake the essential features of which are a detachable metallic brake-block which is so shaped that it is retained in place without bolts and may be readily removed when worn and a new one substituted in lieu thereof without the use of any tools whatever and in which the block-carrier is made readily adjustable, so that the block may be caused to engage the wheel evenly and will wear evenly.

In the accompanying drawings, forming a part of this specification, similar reference characters indicate the same parts in the several figures.

Figure 2:
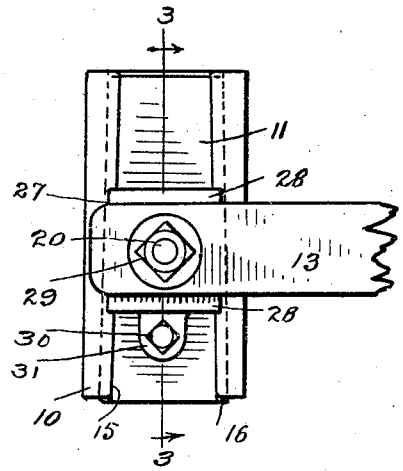
Figure 3:
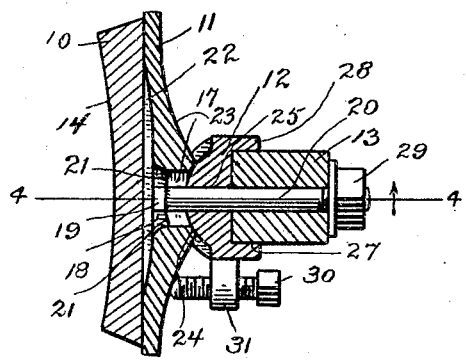
Figure 4:
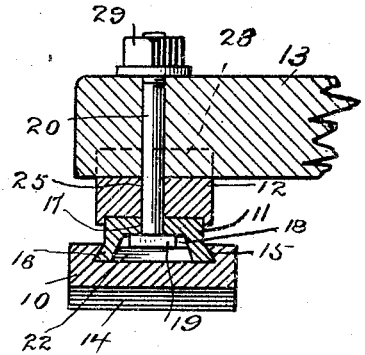
Figure 5:
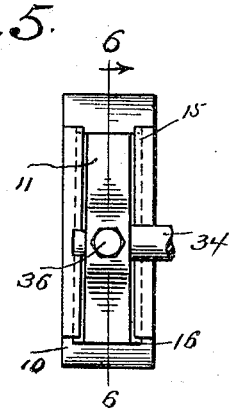

Figure 1 is a side elevation of my novel brake complete and showing it in use locking a wheel; Fig. 2, a rear view corresponding therewith; Fig. 3, a section on the line 3 3 in Fig. 2; Fig. 4, a section on the line 4 4 in Fig. 3; Fig. 5, a view corresponding with Fig. 2, showing a form of the invention especially adapted for lighter vehicles; and Fig. 6 is a section on the line 6 6 in Fig. 5.

In Figs. 1 to 4, inclusive, 10 denotes the brake-block, 11 the carrier, and 12 a holder to which the carrier is adjustably secured and which is itself rigidly secured to the brake-lever 13. The brake-block is a casting and is preferably made approximately the width of the tire upon which it is to be used and is made of sufficient length to insure a firm hold upon the tire. The outer face of the brake-block is curved, as at 14, to correspond with the curvature of the tire, and the inner face is provided with inclined dovetail ways 15, which receive the carrier. It will be noted that these ways incline downward and inward, so that gravity and the friction of the wheel both act to retain the brake-block in engagement with the carrier, but permit of its being readily removed when required. The carrier is provided at its edges with dovetails 16, which are inclined to correspond with the inclination of the ways, and at its center with a longitudinal slot 17, terminating in a recess 18, which receives the head 19 of an attaching-bolt 20. Upon opposite sides of the slot at the bottom of recess 18 are convex shoulders 21, which are engaged by the head of the bolt. In order to lighten the casting and to provide additional room for the bolt-head, if required, the inner face of the carrier may be provided with an additional elongated recess 22, with which recess 18 communicates. The outer face of the carrier is enlarged centrally, as at 23, and is provided with a central transverse concave recess 24, which receives the correspondingly-convex inner face of holder 12. The holder is provided with a central hole 25, through which attaching-bolt 20 passes, and with side flanges 26, which lie on opposite sides of the carrier. The outer face of the holder is provided with a transverse recess 27, which receives brake-lever 13, side flanges 28 upon the holder retaining the block rigidly in position relatively to the lever. The parts are locked in position by a nut 29, which engages the threaded outer end of the attaching-bolt. As a means of locking the carrier, and with it the brake-block, at any desired adjustment relative to the holder I provide a set-bolt 30, which passes through a lug 31, extending from the holder, and the point of which engages the outer face or back of the carrier. 32 in Fig. 1 indicates a felly, and 33 the tire, of a vehicle-wheel upon which the brake is acting. The special means by which the brake-lever is actuated is wholly unimportant so far as the present invention is concerned, it being simply required that the brake-lever and brake be actuated in the ordinary or any preferred manner.

Figure 6:
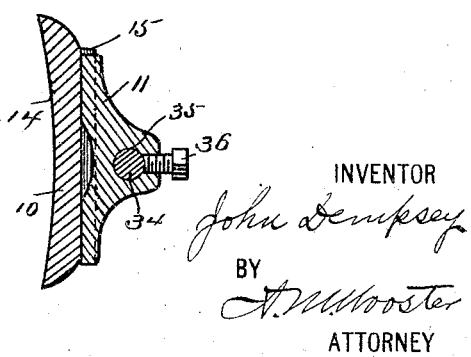

In the form illustrated in Figs. 5 and 6 the brake-shoe engages the carrier in the same manner as in the other form. This being a much lighter construction, however, and for use upon light vehicles, the device is simplified by doing away with the holder and attaching the carrier directly to the brake-lever. In the present instance the brake-lever, which is indicated by 34, is a round rod which passes through a transverse hole 35 in the carrier, which is shown as locked to the brake-lever by means of a set-bolt 36.

The operation is as follows: The brake-block is placed in position by sliding it downward, with the dovetails on the carrier in engagement with the ways in the brake-block. In the form illustrated in Figs. 1 to 4, inclusive, the adjustment of the carrier and brake-block relative to the holder and brake-lever is determined by turning set-bolt 30 in or out, as may be required, the carrier and brake-block oscillating freely on the holder when nut 29 is loosened through the engagement of the convex inner face of the holder with concave recess 24 in the carrier and the engagement of the head of the bolt with convex shoulders 21 in the recess in the carrier. The carrier and holder are locked to the brake-lever after adjustment by turning down nut 29 upon the back of the lever, a washer being preferably interposed for the nut to bear against.

In the form illustrated in Figs. 5 and 6 the adjustment of the carrier and brake-block relative to the brake-lever is effected by oscillating the carrier on the brake-lever when set-bolt 36 is loosened, the carrier being locked to the brake-lever after adjustment by tightening up the set-bolt.

Having thus described my invention, I claim—

1. A brake comprising a carrier having dovetails upon its edges and a concave recess in its outer face, a brake-block having in its inner face ways which receive the dovetails, a holder having a convex outer face to engage the recess in the carrier and a bolt passing through the carrier and holder by which said parts are secured to a brake-lever.

2. A brake comprising a carrier having dovetails upon its edges, a concave recess in its outer face, a longitudinal slot, a recess in which the slot terminates and convex shoulders in the recess on opposite sides of the slot, a brake-block having in its inner face ways which receive the dovetails, a holder having a convex outer face which engages the recess in the carrier and a bolt passing through the carrier and holder and having a head engaging the convex shoulders, by which the carrier and brake-block are adjustably secured to the holder and the holder is secured to a brake-lever.

3. A brake comprising a carrier having downwardly and inwardly inclined dovetails upon its edges and a concave recess in its outer face, a brake-block having in its inner face ways which receive the dovetails, a holder having a convex outer face to engage the recess in the carrier and a bolt passing through the carrier and the holder from the front by which the carrier is locked to the holder and the holder is secured to the brake-lever.

4. A brake comprising a carrier having dovetails upon its edges and a concave recess in its outer face, a brake-block having in its inner face ways which receive the dovetails, a holder adjustable relative to the carrier, a bolt passing through the carrier and holder from the front by which said parts are secured to a brake-lever and a set-bolt bearing upon the carrier by which the carrier and brake-block are locked at any desired adjustment.

In testimony whereof I affix my signature in presence of two witnesses.

JOHN DEMPSEY.

Witnesses:
 PETER HINES,
 P. W. ROWE.